United States Patent
Moore et al.

[15] 3,644,258
[45] Feb. 22, 1972

[54] METHOD OF PREPARING HIGH-SOLIDS LATEXES OF OLEFIN POLYMERS

[72] Inventors: Carl Moore, Midland; James B. Louch, Coleman, both of Mich.; Russell L. Stainfield, Williamsburg, Va.

[73] Assignee: The Dow Chemical Company, Midland, Mich.

[22] Filed: Mar. 19, 1969

[21] Appl. No.: 808,690

[52] U.S. Cl............260/29.6 H, 260/29.6 TA, 260/29.6 SQ, 260/29.7 U
[51] Int. Cl. ........................................C08f 3/42
[58] Field of Search..............260/79.3 M, 29.6 H, 29.6 PT, 260/29.7 U, 29.6 TA, 29.6 SQ

[56] References Cited

UNITED STATES PATENTS

| | | | |
|---|---|---|---|
| 2,538,273 | 1/1951 | Rhines | 260/29.6 PT UX |
| 3,033,833 | 5/1962 | Le Fevre et al. | 260/79.3 M |
| 3,049,500 | 8/1962 | Howland et al. | 260/29.7 UX |
| 3,049,501 | 8/1962 | Howland et al. | 260/29.7 UX |
| 3,049,502 | 8/1962 | Howland et al. | 260/29.7 UX |
| 3,389,109 | 6/1968 | Harmon et al. | 260/29.6 H |

*Primary Examiner*—Julius Frome
*Assistant Examiner*—James B. Lowe
*Attorney*—Griswold and Burdick, R. G. Waterman and L. J. Dankert

[57] ABSTRACT

Fluid, high-solids latexes of normally solid, water and alkali insoluble thermoplastic organic addition polymers containing a plurality of acid groups in the polymer structure are prepared by (1) heating a low-solids aqueous emulsion of the polymer, e.g., ethylene/acrylic acid copolymer, at the softening point of the polymer while simultaneously lowering the pH of the emulsion to a value between about 6.0 and about 8.3 and (2) concentrating the emulsion.

10 Claims, No Drawings

3,644,258

METHOD OF PREPARING HIGH-SOLIDS LATEXES OF OLEFIN POLYMERS

BACKGROUND OF THE INVENTION

This invention relates to fluid, high-solids latexes of thermoplastic organic addition polymers containing a plurality of acid groups in the polymer structure and methods for the preparation thereof.

It is known in the art that certain synthetic organic polymers such as polymers of ethylene, of styrene, of acrylic esters and of vinyl esters have found utility in a great many commercial applications, particularly as adhesives and various coating materials. As is the case with most polymeric coating materials, it is desirable that the polymers be applied to substrates in the form of aqueous colloidal dispersions, typically called latexes, preferably in the form of fluid, high-solids latexes.

Unfortunately, latexes of the above-described synthetic organic polymers are somewhat difficult to prepare, especially in the form of fluid, high-solids latexes. In general it has been the practice in the art to prepare relatively low-solids latexes of such polymers, for example, the ethylene/carboxylic acid copolymers, by dispersing the mass polymers in aqueous media with the aid of surfactants and emulsifiers and with or without the aid of organic solvents that are subsequently removed. Latexes, thus prepared, may have polymer solids concentrations as high as 25 to 30 weight percent, but when such latexes are concentrated by conventional techniques such as evaporation, they form thick, viscous pastes which are totally unsuited for use as coating compositions. Similar problems are encountered in concentrating latexes of the synthetic organic polymers prepared by other methods, e.g., digestion of the mass polymer in hot base.

In view of the difficulty of preparing fluid, high-solids latexes of thermoplastic organic polymers containing a plurality of acid groups in their polymer structure, it would be highly desirable to provide a means for the preparation thereof.

SUMMARY OF THE INVENTION

In accordance with the present invention fluid, high-solids latexes of normally solid, water and alkali insoluble thermoplastic organic addition polymers containing a plurality of acid groups in their polymer structures are prepared by a method comprising the steps of (1) heating a fluid, low-solids aqueous emulsion of the thermoplastic organic addition polymer in its alkaline salt form at a temperature between the softening point of the polymer and the point at which the polymer degrades while simultaneously lowering the pH of the emulsion to a value between about 6.0 and about 8.3 and (2) concentrating the emulsion to a fluid latex having polymer solids content from about 40 to about 65 weight percent and broad distribution of particle sizes ranging from about 0.08 to about 2 microns. For the purposes of this invention, the term "stable latex" is defined as an aqueous colloidal dispersion of thermoplastic organic polymer which is stabilized primarily by the presence of acid groups (at least some of which are in ionizable salt form) on the surfaces of the polymer particles. During step (1) of the above-described method the low-solids emulsion undergoes partial or limited destabilization which probably results from lowering the pH of the emulsion. Lowering of the pH converts the acid groups from the anionic form to the form of free acid, thus making the polymer particles less hydrophilic. As a result of the partial destabilization, at least a portion of the small polymer particles of the starting emulsion agglomerate to form relatively large clusters of particles. By simultaneously subjecting the emulsion to temperatures at or above the softening point of the polymer, each cluster of particles is caused to sinter and fuse into one spheroidal globule having increased mass and size. The resulting emulsion which contains many of these large globules is capable of being concentrated to form a fluid, high-solids latex.

The fluid, high-solids latexes prepared in the practice of this invention are useful as protective coating compositions for many different wood, metal, glass, paper and plastic substrates. Such compositions may also be utilized advantageously as carpet back-sizing, binders for nonwoven fabrics or felts, moldable plastic binders and adhesives, adhesive coatings for metals and the like.

DESCRIPTION OF THE PREFERRED EMBODIMENTS

The method of this invention requires as starting material a normally solid, water and alkali insoluble thermoplastic organic addition polymer in the form of a fluid, relatively low-solids aqueous emulsion. The suitable addition polymers can be of any chemical structure so long as the polymers have the aforementioned physical properties and contain a plurality of carboxylic acid groups. By "acid group" is meant a group capable of neutralization by aqueous base to form a water-ionizable salt, especially the carboxy ($-CO_2H$) and the carboxylic acid anhydride groups which react with aqueous alkali to form water-ionizable salt groups. The occurrence of acid groups in the polymer should be general throughout the macromolecules thereof so that each macromolecule contains a minimum number of active acid groups sufficient to enable the polymer to make a colloidal dispersion when contacted with aqueous base. The maximum number of acid groups which may be present in the macromolecules is fixed by the requirement that the polymer be substantially water insoluble. Generally speaking, suitable polymers contain from about 4 to about 35 weight percent of acid comonomer with preferred polymers containing from about 11 to about 25 weight percent of acid comonomer.

Typical acid polymers are addition polymers of ethylenically unsaturated monomers where the starting monomers include one having an acid group of the kind specified. For example, suitable polymers are the random copolymer products of copolymerization of mixtures of one or more polymerizable ethylenically unsaturated carboxylic acids such as acrylic acid, methacrylic acid, maleic acid and anhydride, itaconic acid, fumaric acid, citraconic acid and anhydride, methyl hydrogen maleate, and the like, and one or more nonacid polymerizable monomers, such as ethylene, propylene, butene-1, 1,3-butadiene, and other aliphatic olefins; styrene, α-methylstyrene, vinyltoluene, chlorostyrene, and other aromatic olefins; ethyl acrylate, methyl methacrylate, vinyl acetate and other unsaturated esters; vinyl and vinylidene chloride; vinyl ethers; acrylamide; acrylonitrile; and the like. Particularly suitable copolymers include:

1. Copolymers of ethylene and from about 8 to about 30 percent by weight of one or more ethylenically unsaturated acids such as acrylic acid, methacrylic acid, methyl hydrogen maleate, etc., as above recited;

2. Copolymers of ethylene, from about 8 to about 30 percent by weight of one or more ethylenically unsaturated acids, and up to about 20 percent by weight of one or more other monomers such as ethyl acrylate, vinyl acetate, etc., as above recited;

3. Copolymers of styrene (and/or other ar-vinylaromatic compounds) and from about 8 to about 30 percent by weight of one or more ethylenically unsaturated acids such as acrylic acid, maleic anhydride, etc., as above recited.

Other polymers are made from preformed and nonacid polymers by subsequent chemical reaction carried out thereon. For example, the carboxylic acid group may be supplied by grafting a monomer such as acrylic acid or maleic anhydride onto a polymer substrate; carboxylic anhydride, ester, amide, acyl halide, and nitrile groups can be hydrolyzed to carboxylic acid groups.

Specific examples and illustrations of representative organic acid copolymers, given for purpose of illuminating the description and not to limit the scope of the invention are:

Ethylene/acrylic acid copolymers, ethylene/methacrylic acid copolymers, ethylene/itaconic acid copolymers, ethylene/methyl hydrogen maleate copolymers, ethylene/maleic acid copolymers, ethylene/acrylic acid/methyl methacrylate (ternary) copolymers, ethylene/acrylic acid/ethyl acrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene/acrylic acid/vinyl acetate copolymers, ethylene/methacrylic acid/vinyl acetate copolymers, ethylene/acrylic acid/vinyl alcohol copolymers, ethylene/propylene/acrylic acid copolymers, ethylene/acrylamide/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, polyethylene/acrylic acid graft copolymers, polyethylene/methacrylic acid graft copolymers, polymerized ethylene/propylene/acrylic acid graft copolymers, styrene/acrylic acid copolymers, styrene/methacrylic acid copolymers, styrene/itaconic acid copolymers, styrene/methyl methacrylate/acrylic acid copolymers, styrene/maleic anhydride copolymers, styrene/citraconic anhydride copolymers, ar-chlorostyrene/acrylic acid copolymers, ar-t-butylstyrene/acrylic acid copolymers, methyl methacrylate/isobutyl acrylate/acrylic acid copolymers.

Specific procedures and means for making polymers are known to the art and do not constitute the essence of the present invention. While particular polymers are used in the description of the invention for purposes of illustrating the same, it will be understood that other polymers may be used. The suitability of any polymer for the present purposes can be readily ascertained by a few preliminary tests following the present description. This is particularly advantageous when the starting polymeric material is of unknown composition or history and it is not possible to ascertain its exact chemical structure.

The suitable polymers are converted from mass form to low-solids, aqueous emulsions by any of several techniques. In one technique, a suitable polymer is dissolved in a water-miscible liquid; the resulting solution is dispersed in an aqueous medium; and the water-miscible liquid is then stripped from the dispersion. See U.S. Pat. No. 3,389,109. Generally methods which require the use of little or no emulsifier or other surface-active agents are preferred, as desirable starting aqueous emulsions characteristically contain no emulsifier or amounts less than that required to completely cover the surface area of the polymer particles. Typically a starting aqueous emulsion also has a polymer solids content from about 14 to about 35 weight percent and sufficient stabilizing base to give the emulsion a pH of at least about 7.5. Among the various stabilizing bases which may be used are the hydroxides of the alkali metals such as sodium hydroxide, lithium hydroxide, and potassium hydroxide; concentrated ammonia; ammonium hydroxide; tetramethylammonium hydroxide; monoalkyl amines such as ethylamine and propylamine; secondary and tertiary amines such as dimethylamine and trimethylamine, diethyl and triethyl amine and the like; monoalkanol amines such as ethanolamine and propanolamine; polyalkanolamines such as di- and triethanolamine; monocycloalkyl amines such as cyclohexylamine; and monocycloalkanol amines such as cyclohexanolamine.

The method of this invention is suitably carried out by (1) heating a fluid, low-solids aqueous emulsion of a thermoplastic organic addition polymer, as previously described, to a temperature between the softening point of the polymer and the point at which the polymer degrades while simultaneously lowering the pH of the emulsion to a value between about 6.0 and about 8.3 and (2) then concentrating the emulsion to a fluid, high-solids latex. In practicing said method, it is preferable to heat the emulsion to a temperature at or just above the softening point of the polymer of the emulsion, generally to temperature in the range from about 80° C. to about 140° C. for a period from about 2 to about 24 hours, preferably from 4 to 12 hours. Simultaneously it is preferred to lower the pH of the emulsion to a value between about 6.5 and about 7.1.

Lowering of pH is suitably carried out by one of several techniques, e.g., loss of volatile cation such as ammonia, addition of acid or by contacting the emulsion with ion exchange resins capable of replacing the salt cations by hydrogen ions. Of these techniques, lowering pH by volatilizing a volatile cation is preferred as it requires less physical or chemical disruption of the emulsion which often causes excessive destabilization.

In order to prepare latexes having polymer solids greater than 50 weight percent, it is usually preferable to add a small amount of an emulsion stabilizing means and/or a small amount of an emulsion coalescing means to the aqueous emulsion prior to and/or during step (1) of the hereinbefore described method. Presence of emulsion stabilizing means permits further destabilization (i.e., by further lowering of the pH) of the aqueous emulsion without irreversible coagulation of the emulsion. The additional destabilization causes further agglomeration of particles to form larger clusters of the polymer particles. It is thought that the emulsion coalescing means sorb onto the surfaces of the polymer particles and lie on the interface between the particle and aqueous medium in such a manner as to incompletely shield it. As a result, particle-to-particle contacts are permitted that in a certain number of cases lead to the union of two or more particles. Eventually a number of particles agglomerate in the form of clusters which upon further heating sinter and fuse into compact, microscopic globules or beads. Emulsions of these larger beads can then be made more concentrated without loss of fluidity than can emulsions of smaller particles or beads.

Emulsion stabilizing means, i.e., anionic emulsifiers or mixtures thereof with nonionic emulsifiers, is added in amounts less than that required to completely cover the surface area of the polymer particles of the starting emulsion. See D. C. Blackley, *High Polymer Latices*, Vol. 2, McClaren & Sons, London, 486–491(1966) for a more complete discussion of the interrelationship between particle surface area and emulsifier concentration and latex stability. Excessive amounts of emulsifier inhibit the agglomeration of the small particles of the starting emulsion to form the large clusters which must be formed in the successful practice of this invention. As a general rule suitable amounts of emulsion stabilizing means range up to about 5 weight percent based on the polymer solids, preferably from about 2 to about 4 weight percent. Examples of suitable anionic emulsifiers include the water-soluble soaps of soap-forming monocarboxylic acids, e.g., alkali metal salts of linoleic acid, of oleic acid, of stearic acid, of palmitic acid, of myristic acid, of lauric acid, of capric acid and the like. Also included are the sulfonated and sulfated compounds having the general formula $R-SO_3M$ and $R-OSO_3M$ wherein R represents an organic radical having from nine to 23 carbon atoms and M represents an alkali metal, an ammonium or like group. Examples of the sulfonate and sulfate emulsifiers include dodecyl sodium sulfonate, sodium oleyl sulfate, ammonium dodecylbenzene sulfonate, potassium lauryl sulfate, disodium dodecylphenyl oxide disulfonate, dioctyl potassium sulfosuccinate, dihexyl sodium sulfosuccinate, and the aryl sulfonate-formaldehyde condensation products. Disodium sulfonate of dodecyldiphenyl oxide is a preferred emulsifier. Suitable nonionic emulsifiers include the polyoxyethylene agents, e.g., ethylene glycol polyethers, ethylene nonylphenol polyethers, and the like; fatty acid esters of polyhydric alcohols, e.g., propylene glycol fatty acid ester and the like. Other suitable nonionic emulsifiers are described in Becher, *Emulsions: Theory and Practice*, 2d ed., Reinhold Publishing Corporation, New York, 221–225 (1965).

Emulsion coalescing means suitable to use in the preferred embodiments of this invention include polyvinyl methyl ether, the water-soluble copolymers of sulfo esters of $\alpha,\beta$-ethylenically unsaturated carboxylic acids, and other water-soluble polyelectrolytes which are pH sensitive. Preferred coalescing aids are the copolymers of sulfo esters of $\alpha$-methylene carboxylic acids and water-insoluble monomers, particularly those described in U.S. Pat. No. 3,033,833. An especially preferred coalescing aid is a copolymer of 30 weight percent of 2-sulfoethyl methacrylate and 70 weight percent of n-butyl acrylate. Said coalescing aids are employed in concentrations up to about 2 weight percent based on polymer solids, preferably from about 0.2 to about 1 percent.

After treating the starting emulsion according to step (1), the emulsion is then concentrated to a fluid, high-solids latex by any one of several known techniques, for example, evaporation creaming and centrifugation. In one embodiment the latex is concentrated by evaporating a portion of the aqueous medium of the emulsion by subjecting the emulsion to vacuum at 60° to 65° C. Following concentration it is normally desirable to stabilize the latex by increasing the pH of the latex to a value from about 7.2 to about 9.5, usually by adding ammonia or an alkali such as sodium hydroxide, potassium hydroxide, etc. The concentrated latexes have very broad particle size distributions, often with particles ranging from about 0.08 to about 2 microns in diameter.

The following examples are given to illustrate the invention, but are not to be read as limiting its scope. In the following specification and claims all parts and percentages are by weight unless otherwise indicated.

EXAMPLE 1

A latex of a copolymer of 83.2 parts ethylene and 16.8 parts acrylic acid is prepared at 23.8 percent polymer solids and pH of 9.4 by digestion of granules of the solid polymer in hot, aqueous ammonia. To the latex are added 4.0 parts of disodium dodecyl phenyloxide disulfonate (45 percent active) and 0.2 part of a 10-percent alkaline solution (pH=10.3) of a copolymer of 70 percent of n-butyl acrylate and 30 percent of 2-sulfoethyl methacrylate. The latex is charged to a Pyrex flask fitted with a stirrer, condenser, nitrogen inlet tube, thermowell, and regulated heat source. The latex is distilled continuously at 100° C. in presence of nitrogen for a period of 125 minutes. Pure water is added to the latex to maintain a substantially constant solids content and the pH of the latex is lowered by the continuous vaporization of ammonia present in the starting latex.

The pH, solids content and physical appearance of the latex at different time intervals are shown in the following Table I.

TABLE I

| Time(min) | Latex pH | Latex Solids Content % | Appearance |
|---|---|---|---|
| 0 | 9.4 | 23.8 | Bluish opalescence |
| 25 min. | Started to distill | | Bluish opalescence |
| 75 | 7.8 | 26.4 | Bluish opalescence |
| 110 | 7.3 | 30.0 | Getting white |
| 135 | — | 30.0 | White latex |
| 145 | 6.9 | 30.0 | White latex |
| 150 | 6.9 | 31.0 | White latex |

After the 150-minute heating period, the latex is cooled to room temperature and is filtered through cotton cloth leaving a dry residue of about 0.2 parts based on the weight of latex polymer. The filtered latex is a stable, fluid, white latex having a solid content of 31 percent polymer and pH of 6.9.

The filtered latex is evaporated in a Rinco apparatus operated at 60° to 65° C. under a partial vacuum. The physical properties of the evaporated latex and latexes in which various bases were added to further stabilize the latex are shown in the following Table II.

TABLE II

| Base Type | % of Neutral Equivalent | Final Latex Solids (%) | Final Latex pH | Appearance |
|---|---|---|---|---|
| — | — | 60.0 | 6.4 | Stable, fluid, white |
| KOH | 20 | 54.4 | 8.5 | Stable, fluid, white |
| NaOH | 5 | 62.1 | 7.0 | Stable, fluid, white |
| NaOH | 10 | 55.6 | 7.5 | Stable, fluid, white |
| NH₄OH | 20 | 55.2 | 7.5 | Stable, fluid, white |
| NH₄OH | 40 | 61.3 | 7.5 | Viscous, stable, white |

EXAMPLES 2-5

The latex of Example 1 is treated according to the procedure of Example 1 except that different amounts of emulsifier and coalescing aid are added to the starting latex. The treated latexes are then evaporated to maximum solids content without loss of fluidity. The properties of the treated latexes as they are affected by different amounts of emulsifier and coalescing aid are shown in the following Table III for comparison purposes.

TABLE III

| Ex. No. | Percent additives Emulsifier [1] | Percent additives Coalescing aid [2] | After treatment pH | After treatment Solids (percent) | After evaporation pH | After evaporation Solids | Appearance |
|---|---|---|---|---|---|---|---|
| 2 | 4.0 | 0.4 | 7.0 | 25.9 | 8.3 | 50.5 | Stable, clean white. |
| 3 | 4.0 | 0.8 | 7.0 | 25.5 | 8.6 | 51.1 | Fluid, white clean. |
| 4 | None | 0.8 | 6.9 | 27.0 | 8.7 | 39.0 | Do. |
| 5 | do | 2.0 | 6.9 | 27.0 | 8.5 | 40.0 | White, slightly viscous. |

[1] Disodium sulfonate of dodecyl diphenyl oxide.
[2] Copolymer of 30 percent of 2-sulfoethyl methacrylate and 70 percent of n-butyl acrylate.

EXAMPLE 6

A latex of a terpolymer of 70 parts ethylene, 15 parts isobutyl acrylate, and 15 parts acrylic acid having a solids content of 25.3 percent solids and a pH of 8.5 is treated according to the procedure of Example 1 except that the treating step is carried out for 200 minutes. The pH, solids content and physical appearance of the treated latex are shown in the following Table IV.

TABLE IV

| Elapsed Time, Minutes | Latex pH | Latex Solids Content (%) | Appearance |
|---|---|---|---|
| 0 | 8.5 | 25.3 | Bluish opalescence |
| 75 | 7.2 | 25.3 | Turning white slowly |
| 90 | 7.0 | 25.3 | Turning white slowly |
| 105 | 6.9 | 25.3 | Whiter |

| | | | |
|---|---|---|---|
| 120 | 6.8 | 25.3 | Whiter |
| 150 | 6.5 | 25.3 | Whiter, stable, clean, no flocculant material |
| 185 | 6.4 | 26.0 | White, a little flocculant material in the surface froth |
| 200 | 6.4 | 26.3 | White, a little flocculant material in the surface froth |

The product is filtered through cotton cloth. The yield of white, fluid latex is approximately 99 percent of the starting solids. Portions of the treated latex, after evaporation and addition of base, exhibit the physical properties shown in the following Table V.

TABLE V

| Base | % of Neutral Equivalent* | Final Solids | Final pH | Appearance |
|---|---|---|---|---|
| Na | 20 | 51.0 | 8.5 | Fluid, white, stable |
| NH$_4$ | 40 | 60.2 | 7.5 | Fluid, white, stable |

*Neutral equivalent of base per equivalent of acid in the copolymer.

As evidenced in the table above, fluid latexes having polymer solids higher than 60 weight percent are prepared by the method of this invention.

EXAMPLE 7

The latex of Example 1 is charged to a reaction vessel having a regulated heat source and is distilled continuously at 100° C. in the presence of nitrogen until the pH is lowered to 7. Pure water is added continuously to the latex to maintain a substantially constant polymer solids content. The resulting latex is filtered and concentrated to a fluid, stable latex having a polymer solids content of 45 percent.

What is claimed is:

1. A method for preparing a fluid, high-solids latex of a normally solid, water and alkali insoluble thermoplastic copolymer containing an olefin selected from the group consisting of ethylene, propylene, and butene-1 and from about 4 to about 35 weight percent based on the copolymer of a polymerizable α,β-ethylenically unsaturated carboxylic acid comprising the steps of (1) heating a fluid, low-solids aqueous emulsion of the copolymer in an alkaline salt form and having from about 14 to about 35 weight percent copolymer solids based on the emulsion to a temperature between the softening point of the copolymer and the point at which the copolymer degrades while simultaneously lowering the pH of the emulsion to a value between about 6.0 and about 8.3, said emulsion containing an amount of an emulsifier less than that amount which completely covers the surface area of the copolymer particles of the emulsion and (2) concentrating the emulsion to a latex having polymer solids content from about 40 to about 65 weight percent based on the latex and broad distribution of particle sizes ranging from about 0.08 to about 2 microns.

2. The method according to claim 1 wherein the emulsion contains up to about 5 weight percent of an emulsifier selected from the group of anionic emulsifier and mixture thereof with a nonionic emulsifier said percentage being based on the copolymer.

3. The method according to claim 1 wherein the emulsion is heated to a temperature between about 80° C. and about 140° C.

4. The method according to claim 1 wherein the emulsion contains up to about 2 weight percent of a water-soluble copolymer of a sulfo ester of an α,β-ethylenically unsaturated carboxylic acid, said percentage being based on the copolymer.

5. The method according to claim 1 wherein the copolymer is an ethylene/acrylic acid copolymer.

6. The method according to claim 1 wherein the aqueous emulsion contains a volatile base and the pH is lowered by volatilizing such base.

7. The method according to claim 6 wherein the base is ammonia.

8. The method according to claim 1 for preparing a fluid, high-solids latex of normally solid, water and alkali insoluble copolymer containing an olefin selected from the group consisting of ethylene, propylene and butene-1 and from about 4 to about 35 weight percent based on the copolymer of a polymerizable α,β-ethylenically unsaturated carboxylic acid comprising the steps of (1) heating a fluid, low-solids aqueous emulsion of the copolymer in alkaline salt form and having from about 14 to about 35 weight percent copolymer solids based on the emulsion to a temperature between the softening point of the copolymer and the point at which the copolymer degrades while simultaneously lowering the pH of the emulsion to a value between about 6.0 and about 8.3, said emulsion containing (a) an amount of an emulsifier less than that amount which completely covers the surface area of the copolymer particles of the emulsion and (b) up to about 2 weight percent of a water-soluble copolymer of a sulfo ester of an α,β-ethylenically unsaturated carboxylic acid, and water-insoluble monomer and (2) concentrating the emulsion to a latex having polymer solids content from about 40 to about 65 weight percent based on the latex and broad distribution of particle size ranging from about 0.08 to about 2 microns.

9. A method according to claim 1 for preparing a fluid, high-solids latex of normally solid, water and alkali insoluble copolymer consisting essentially of ethylene, from about 8 to about 30 weight percent based on the copolymer of α,β-ethylenically unsaturated carboxylic acid selected from the group consisting of acrylic acid, methacrylic acid, maleic acid and anhydride, itaconic acid, fumaric acid, citraconic acid and anhydride and methyl hydrogen maleate and up to about 20 weight percent based on the copolymer of another monomer selected from the group consisting of ethyl acrylate, vinyl acetate, propylene, butene-1, 1,3-butadiene, styrene, α-methyl styrene, vinyl toluene, chlorostyrene, ar-t-butylstyrene, methyl methacrylate, vinyl and vinylidene chloride, acrylamide, acrylonitrile, vinyl methyl ether and t-butyl acrylate; said method comprising the steps of (1) heating a fluid, low-solids aqueous emulsion of the copolymer in alkaline salt form and having from about 14 to about 35 weight percent copolymer solids based on the emulsion to a temperature between about 80° C. and about 140° C. which temperature is at least at the softening point of the copolymer while simultaneously lowering the pH by a technique selected from the group consisting of volatilizing a cation from the emulsion, adding an acid to the emulsion, and contacting the emulsion with an ion exchange resin capable of replacing the cations of the alkaline salt groups of the copolymer with hydrogen ions, to a value between about 6.0 and about 8.3, said emulsion containing (a) up to about 5 weight percent based on the copolymer of an emulsifier selected from the group consisting of an anionic emulsifier and a mixture thereof with a nonionic emulsifier provided that the amount of emulsifier is less than the amount which completely covers the surface area of the copolymer particles of the emulsion and (b) up to about 2 weight percent based on the copolymer of a water-soluble copolymer of a sulfo ester of α-methylene carboxylic acid selected from the group consisting of 2-sulfoethyl acrylate 2-sulfoethyl methacrylate, 2-sulfoethyl α-ethylacrylate, 2-sulfoethyl α-propylacrylate, 2-sulfo-1-propyl acrylate, 2-sulfo-1-propyl methacrylate, 1-sulfo-2-propyl acrylate and methacrylate, 1-sulfo-2-butyl acrylate and methacrylate, and 3-sulfo-2-butyl acrylate and methacrylate and water-insoluble monomer selected from the group consisting of styrene, α-methylstyrene, α,ar-dimethylstyrene, methyl methacrylate, ethyl acrylate, hexyl acrylate, butyl acrylate, lauryl methacrylate, acrylonitrile, butadiene, vinyl acetate, vinyl benzoate and vinyl propionate and (2) concentrating the emulsion by a technique selected from the group consisting of evaporation, creaming and centrifugation to a latex having polymer solids content from about 40 to about 65 weight percent based on the latex and broad distribution of particle size ranging from about 0.08 to about 2 microns.

10. A method for preparing a fluid, high-solids latex of normally solid, water and alkali insoluble copolymer consisting essentially of ethylene, from about 8 to about 30 weight percent based on the water-insoluble copolymer of $\alpha,\beta$-ethylenically unsaturated carboxylic acid selected from the group consisting of acrylic acid, methacrylic acid, maleic acid and anhydride, itaconic acid, fumaric acid, citraconic acid and anhydride and methyl hydrogen maleate and up to about 20 weight percent based on the water-insoluble copolymer of another monomer selected from the group consisting of ethyl acrylate, vinyl acetate, propylene, butene-1, methyl methacrylate, vinyl and vinylidene chloride, acrylamide, and acrylonitrile; said method consisting essentially of the steps of (1) heating a fluid, low-solids aqueous emulsion of the copolymer in ammonium salt form and having from about 14 to about 35 weight percent based on the emulsion of copolymer solids to a temperature between about 80° C. and about 140° C. which temperature is at least at the softening point of the water-insoluble copolymer while simultaneously lowering the pH by volatilizing the ammonia from the ammonium salt groups of the copolymer to a value between about 6.0 and about 8.3, said emulsion containing (a) from about 2 to about 4 weight percent based on the water-insoluble copolymer of disodium sulfonate of dodecyldiphenyl oxide and (b) up to about 2 weight percent based on the water-insoluble copolymer of a water-soluble copolymer of 30 weight percent based on the water-soluble copolymer of 2-sulfoethyl methacrylate and 70 weight percent based on the water-soluble copolymer of n-butyl acrylate and (2) concentrating the emulsion by evaporation to a latex having polymer solids content from about 40 to about 65 weight percent based on the latex and broad distribution of particle size ranging from about 0.8 to about 2 microns.

* * * * *